United States Patent

Doenges et al.

[11] Patent Number: 6,111,011
[45] Date of Patent: Aug. 29, 2000

[54] CELLULOSE ETHERS CONTAINING BUTENYL GROUPS AND USE THEREOF AS PROTECTIVE COLLOIDS IN POLYMERIZATIONS

[75] Inventors: Reinhard Doenges, Bad Soden; Rudolf Ehrler, Floersheim; Horst Wurm, Wiesbaden, all of Germany

[73] Assignee: Clariant GmbH, Frankfurt, Germany

[21] Appl. No.: 09/196,666

[22] Filed: Nov. 19, 1998

[30] Foreign Application Priority Data

Nov. 21, 1997 [DE] Germany .................. 197 51 712

[51] Int. Cl.[7] .................. C08L 1/00; C08B 11/00; C08B 11/20
[52] U.S. Cl. .................. 524/733; 536/84; 536/85; 536/90; 536/91; 536/93; 536/95; 536/96; 536/97; 536/98
[58] Field of Search .................. 536/84, 85, 90, 536/91, 93, 95, 96, 97, 98; 527/300; 524/733

[56] References Cited

U.S. PATENT DOCUMENTS

| | | |
|---|---|---|
| 2,082,797 | 6/1937 | Hahn . |
| 3,754,877 | 8/1973 | Klug . |
| 4,845,175 | 7/1989 | Lo . |
| 5,049,634 | 9/1991 | Tsai et al. . |
| 5,166,332 | 11/1992 | Breckwoldt . |
| 5,294,702 | 3/1994 | Breckwoldt et al. . |
| 5,504,123 | 4/1996 | Partan, III . |

FOREIGN PATENT DOCUMENTS

| | | |
|---|---|---|
| 263561 | 7/1989 | Czechoslovakia . |
| 0457092 | 11/1991 | European Pat. Off. . |
| 0541939 | 5/1993 | European Pat. Off. . |
| 0863158 | 9/1998 | European Pat. Off. . |
| 1418271 | 10/1968 | Germany . |
| 1484814 | 7/1986 | U.S.S.R. . |

OTHER PUBLICATIONS

"Hydroxyethylcellulose Protected Polyvinylacetate Emulsions for Adhesives," J.S. van Arkel, Cellulose and its Derivatives, Chapter 26, Ellis Horwood 1985.

"Some Complexation Reactions of Cellulosic Ethers," Y. Avny, R. Rahman, and A. Zilkha, J. Macromol. Sci. A6(7) pp. 1427–1434 (1972).

"Water–Soluble Cellulose Derivatives and Their Commercial Use," T.M. Greenway, Cellulose Polymers, Blends and Composites, Ed. R.D. Gilbert, Carl Hanser, 1994.

*Primary Examiner*—Nathan M. Nutter
*Attorney, Agent, or Firm*—Scott E. Hanf

[57] ABSTRACT

Water-soluble, nonionic cellulose ethers selected from the group consisting of alkylcelluloses and hydroxyalkylcelluloses which are additionally substituted by butenyl groups are used as protective colloids in the preparation of aqueous polymer dispersions.

10 Claims, No Drawings

CELLULOSE ETHERS CONTAINING BUTENYL GROUPS AND USE THEREOF AS PROTECTIVE COLLOIDS IN POLYMERIZATIONS

The present invention is described in the German priority application No. 19751712.9, filed Nov. 21, 1997, which is hereby incorporated by reference as is fully disclosed herein.

The preparation of vinyl polymers by free-radical polymerization in an aqueous, solvent-free medium makes it necessary to emulsify the hydrophobic monomers and, after polymerization is complete, to stabilize the polymer. For this reason, the polymerization of monomer systems comprising water-insoluble vinyl monomers in aqueous systems requires not only surfactants but also protective colloids which, on the one hand, have hydrophilic character and, on the other hand, should also have a dispersing action.

The quality of a polymer dispersion is decisively influenced by the choice of the protective colloid. Important quality criteria which can be influenced by the protective colloids are, for example, the stability, viscosity, rheology, the particle size of the polymer particles of the dispersion and also the amount of coagulum which remains on filtering the dispersion through a sieve. The molecular weight is also influenced by the protective colloid. A further quality criterion is the water absorption of a film which has been produced by spreading and drying a dispersion. This property too is influenced by the protective colloid. In suspension polymerization, the protective colloid controls the particle size of the polymer formed.

It has been known for a long time that polymeric carbohydrates such as starch, dextrans and water-soluble cellulose derivatives are suitable protective colloids for water-containing polymerization systems. The protective colloid most widely used in the commercial production of polyvinyl acetate dispersions is hydroxyethylcellulose (Cellulose and its Derivatives, Chapter 26, Ellis Horwood Limited 1985) which is produced on an industrial scale from cellulose and ethylene oxide.

The decisive process in the use of protective colloids in emulsion polymerization is regarded as being free-radical formation on the protective colloid and subsequent grafting of the monomer onto the colloid. The degree of grafting depends on the free-radical initiator chosen. Free-radical initiators used are customarily diazo compounds, redox initiators, organic or inorganic peroxo compounds. On the other hand, the degree of grafting also depends on the nature of the protective colloid. If the degree of grafting is low, an appropriately high concentration of the protective colloid has to be selected in order to achieve a sufficient effect. However, a high protective colloid concentration is, on the one hand, undesirable for cost reasons and, on the other hand, it also leads to increased hydrophilicity of the polymer which has been spread out to form a film, combined with an increased water absorption.

In U.S. Pat. No. 4,845,175 it is shown that use of hydroxyethylcellulose which has been hydrophobically modified with arylalkyl groups enables the amount of protective colloid to be reduced. However, the preparation of hydrophobically modified hydroxyethylcellulose requires expensive reagents, some of which have to be synthesized via a plurality of steps.

In U.S. Pat. No. 5,049,634 it is indicated that carbohydrates become more accessible for free-radical grafting reactions if 2-propenyl groups are bound to the polymer. The pretreatment of starch with allyl glycidyl ether to give starch derivatives containing allyl groups and the grafting of acetal- or aldehyde-containing monomers onto these are described. CS-A 263 561 describes the grafting of acrylamide onto an allyl-containing carbohydrate polymer specially prepared in dioxane suspension.

The preparation and the polymerizability of allyl-containing cellulose derivatives in solution has already been described in the literature. DE-A 14 18 271 discloses that solutions of allyl-containing polymers form gels on addition of free-radical initiators. EP-A 0 541 939 claims polymeric cellulose derivatives containing allyl glycidyl ether which are likewise polymerizable at a degree of substitution of from 0.05 to 0.5 allyl glycidyl groups per monomeric carbohydrate unit. The addition of carbohydrates modified in this way increases the scratch resistance of emulsion paints. U.S. Pat. No. 5,504,123 describes cellulose ethers having an unsaturated $C_4$–$C_{20}$-alkyl radical as additives for emulsion paints. Improved film-forming properties are said to be the advantage.

Polymerizable alkenyl-containing methyl hydroxypropylcellulose ethers and their use in the production of films and coatings are described in EP-B 0 457 092. The molar degree of substitution is said to be from 0.05 to 1.0.

SU-A 1 484 814 states that allyl-containing cellulose derivatives having a degree of substitution of allyl ether groups of from 0.04 to 0.3 and a degree of polymerization of from 1000 to 1200 can be grafted with vinyl acetate. For practical use in polymerization systems, protective colloids having very high degrees of polymerization are less favorable since they cause high viscosities and associated stirring and conveying problems.

It is an object of the invention to develop novel protective colloids for polymerizations in aqueous systems which, with a reduced usage and good processability, ensure equal or better quality of the polymer dispersions or suspensions produced.

It has been found that the novel hydrophilic butenyl-containing, nonionic cellulose derivatives are very useful as protective colloids in emulsion polymerization if the degree of substitution in respect of butenyl groups does not exceed 0.1 butenyl group per monomer unit. When such protective colloids are employed, a significantly smaller amount can be used compared to conventional protective colloids which contain no butenyl groups.

The invention accordingly provides water-soluble, nonionic cellulose ethers selected from the group consisting of alkylcelluloses and hydroxyalkylcelluloses which are additionally substituted by butenyl groups.

Y. Avny, R. Rahman and A. Zilkha, J. Macromol. Sci. A6(7), 1427–1434 (1972) discloses products of the reaction of alkali metal cellulose with crotyl bromide. However, these are highly substituted and thus hdyrophobic, water-insoluble derivatives.

A preferred embodiment of the invention provides cellulose ethers of the formula

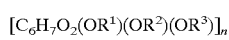

where $C_6H_7O_2$ is an anhydroglucose unit
n is 50–1700, in particular 100–300,
and $R^1$, $R^2$ und $R^3$ are each, independently of one another, a polyalkylene oxide chain of the formula

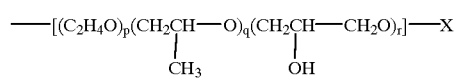

where X=H, $CH_3$, $C_2H_5$ or $CHR^4CR=CHR^6$ where p, q and r independently of one another in $R^1$, $R^2$ and $R^3$ can each independently assume values from 0 to 4, the sum of all (p+q+r) added over $R^1$, $R^2$ and $R^3$ per anhydroglucose unit is, on average, greater than 1.3 and less than 4.5, preferably from 1.5 to 3.0, the order of the oxyalkylene units in the polyalkylene oxide chain can be any order desired and the average number of $CHR^4CR^5\!\!=\!\!CHR^6$ groups per anhydroglucose unit (DS butenyl) is from 0.003 to 0.5, preferably from 0.02 to 0.06.

$R^4$, $R^5$ and $R^6$ are each an H atom or a $CH_3$ group, with only one of the radicals being a $CH_3$ group and the other two each being an H atom.

Examples of cellulose ethers which are preferred according to the invention are the butenyl ethers of hydroxyethylcellulose (1.3<p<4.5; q=0; r=0), hydroxypropylcellulose (p=0; 1.3<q<4.5; r=0, dihydroxypropylcellulose (p=0; q=0; 1.3<r<4.5), and also mixed ethers of the cellulose ethers with the hydroxyalkyl substituents mentioned.

The present invention also provides processes for preparing the cellulose ethers of the invention by etherification of cellulose with an etherifying agent selected from the group consisting of alkyl halides and alkylene oxides and etherification with an alkenyl halide or alkenyl glycidyl ether in the presence of a base or by etherification of cellulose ethers selected from the group consisting of alkylcelluloses and hydroxyalkylcelluloses with an alkenyl halide or an alkenyl glycidyl ether in the presence of a base, preferably A) by etherification of cellulose with ethylene oxide and/or propylene oxide and/or glycidyl alcohol and with butenyl halide in the presence of a base or with butenyl glycidyl ether using base catalysis, preferably in a suspension medium;

B) by etherification of hydroxyethylcellulose, hydroxypropylcellulose, dihydroxypropylcellulose or a cellulose ether having a plurality of the hydroxyalkyl substituents mentioned with a butenyl halide in the presence of a base or with butenyl glycidyl ether using base catalysis, preferably in a suspension medium.

As suspension media, preference is given to using lower alcohols or ketones, for example isopropanol, tert-butanol or acetone in a weight ratio to cellulose of from 3:1 to 30:1, preferably from 8:1 to 15:1. As base, use is usually made of aqueous solutions of alkali metal hydroxides, in particular sodium hydroxide. The molar ratio of base/anhydroglucose units is determined by the carbohydrate (derivative) used. When using cellulose (method I), the molar ratio is preferably from 1.0 to 1.5, for products which are already etherified (method II), preferably from 0.1 to 1.0, mol of base per anhydroglucose unit.

The water content of the reaction mixture is preferably from 5 to 30, in particular from 8 to 20, mol of water per anhydroglucose unit.

After initial charging of the suspension medium, addition of the cellulose (or the cellulose ether) and making alkaline with the aqueous base, the mixture is homogenized well and stirred without supply of heat, if appropriate with cooling, for preferably from 0.5 to 2 hours. The etherification reagents (epoxyalkanes, alkyl halides, alkenyl halides, alkenyl glycidyl ethers) are then added together or in succession. The mixture is then brought to the preferred temperature of from 60 to 120° C., in particular from 80 to 100° C., and is heated for preferably from 2 to 6 hours.

After cooling, the mixture is neutralized with an acid, preferably hydrochloric acid, nitric acid or acetic acid, preferably to a pH of from 6 to 8. The suspension medium is removed by decantation or filtration, the crude cellulose mixed ether can be freed of the adhering by-products, for example polygycols, glycol ethers and salts, by extraction with aqueous alcohols or ketones having a preferred water content of from 10 to 50% by weight, in particular isopropanol, ethanol and acetone. After drying under reduced pressure or at atmospheric pressure at from 50 to 120° C., the desired cellulose mixed ether is obtained as a colorless to slightly yellowish powder.

If required, the degree of polymerization which is desired according to the invention for the cellulose ether can be set before or during the preparation process by addition of a peroxo compound such as hydrogen peroxide or a peroxodisulfate salt or another oxidant, for example sodium chlorite. The methods mentioned for decreasing the molecular weight and the respective industrial implementation are prior art (T. M. Greenway in "Cellulosic Polymers, Blends and Composites", edited by R. D. Gilbert, Carl Hanser Verlag, Munich, 1994, p.178ff.).

The invention also provides for the use of the cellulose ethers of the invention as protective colloids in the preparation of aqueous polymer dispersions by free-radical-initiated polymerization of ethylenically unsaturated monomers in aqueous emulsion.

The proportion of the cellulose ethers of the present invention in the preparation of such polymer dispersions is preferably from 0.2 to 5.0% by weight, in particular from 0.3 to 1.0% by weight, based on the total amount of monomers used.

Suitable monomers are ethylenically unsaturated, free-radical-polymerizable compounds which are themselves insoluble in water, for example simple ethylenically unsaturated hydrocarbons having chain lengths of from 2 to 12 carbon atoms, preferably ethylene and propylene;

esters having chain lengths of from 2 to 12 carbon atoms of acrylic, methacrylic, maleic, fumaric or itaconic acid, preferably ethyl, propyl and butyl esters;

vinyl esters of unbranched and branched carboxylic acids having chain lengths of from 1 to 12 carbon atoms, in particular vinyl acetate and vinyl esters of Versatic acids;

ethylenically unsaturated aromatic compounds, preferably styrene;

ethylenically unsaturated aldehydes and ketones having from 3 to 12 carbon atoms, preferably acrolein, methacrolein and methyl vinyl ketone, halogen-containing ethylenically unsaturated compounds, for example vinyl chloride.

Particular preference is given to mixtures of the abovementioned monomers in which at least one component is a vinyl ester, preferably vinyl acetate. It is also possible to use mixtures of one or more of the monomers mentioned with hydrophilic monomers, for example acrylonitrile, acrylic acid, methacrylic acid, itaconic acid or mixtures thereof.

An aqueous polymerization recipe in which the cellulose ethers of the invention are used as protective colloids preferably contains from 10 to 70% by weight, preferably from 30 to 60% by weight, of the abovementioned monomers, plus from 0 to 10% by weight of one or more emulsifiers. Free-radical initiators used are usually diazo compounds, redox initiators, organic or inorganic peroxo compounds in amounts of from 0.1 to 3% by weight, preferably from 0.5 to 1% by weight, based on the total amount of monomers. Further auxiliaries, for example buffer substances or preservatives can be added.

All components can be initially charged together at the beginning of the reaction, with the monomer or monomer mixture being emulsified by stirring or other mixing devices.

The polymerization process is started by increasing the temperature. The temperatures required are dependent on the initiator system used and are from 40 to 120° C. After the reaction has started, cooling may also be necessary as a result of the exothermic nature of the reaction. The end of the reaction can be recognized by abatement of the evolution of heat. If desired, this is followed by an after-reaction with external supply of heat to complete the reaction. After cooling, auxiliaries for setting the pH, for example buffers, acids or bases, or for stabilization, for example preservatives, can be added. The polymerization can also, if desired, be started with a fraction, for example from 10 to 20% by weight, of the amount of monomers and free-radical initiator and further monomers and free-radical initiator can be metered in after the reaction has started, preferably in such a way that the desired polymerization temperature is controlled by the addition.

The dispersions obtained according to the invention have the following properties:

Viscosity of the dispersions at a low shear rate ($1.0 \text{ s}^{-1}$):

For good processability and stability of the dispersion, a viscosity of from 10,000 to 30,000 mPa·s, in particular from 15,000 to 25,000 mPa·s, is preferred Viscosity of the dispersions at a high shear rate (>$250 \text{ s}^{-1}$)

For good conveyability of the dispersions, the viscosity at a high shear rate should preferably be <450 mPa·s (at 250 $s^{-1}$), in particular from 200 to 420 mPa·s.

Mean particle size of the dispersion:

The mean particle size of the dispersion should preferably be from 200 to 300 nm (measured at a wavelength of 435 nm) in order to prevent undesired settling of the dispersion (serum formation).

Amount of coagulum after filtration of the dispersion through 100 μm and 40 μm sieves, expressed in mg of coagulum per 1000 g of dispersion: The dispersions preferably have a coagulum content of <1000 mg/kg of dispersion when filtered through a 40 μm sieve.

Water absorption of the dried polymer films:

The dispersion is poured onto a plate and dried to form a film. After treatment with water, the 1st water absorption (in % by weight of the weight of the polymer film itself) is determined by the weight increase. After drying again, the 2nd water absorption is determined. The 1 st water absorption is generally greater than the 2nd water absorption, since the hydrophilic components (emulsifiers, protective colloid) are washed out during the first irrigation of the film. It should preferably be less than 25%, in particular from 5 to 20% by weight.

In addition to the use parameters mentioned, the grafting yield of the protective colloid used plays an important role. A high grafting yield indicates a high efficiency of the protective colloid. However, excessively high grafting yields lead to crosslinking of the polymer particles, associated with a high proportion of coagulum and dilatant flow behavior of the dispersion. The grafting yield is preferably from 15 to 30%, in particular from 20 to 25%.

The use of the butenyl-containing hydroxyethylcellulose of the present invention in the preparation of vinyl dispersions has the advantage that the amount which needs to be used is only half that of a conventional, commercial hydroxyethylcellulose and that the dispersions which are prepared using the protective colloids employed according to the invention are of better quality.

EXAMPLES

The figures for the degree of substitution are based on the molar degree of substitution (MS) in the case of hydroxyethyl groups and on the degree of substitution (DS) in the case of butenyl groups. In both cases, these values indicate how high the degree of substitution of the respective group is per anhydroglucose unit.

The pure active compound content is determined by subtracting the moisture content and the residual salt content of the product.

Tylose® H10 is a hydroxyethylcellulose from Clariant AG having an average degree of polymerization n=180 whose 2% strength solution in water has a viscosity of about 10 mPa·s (by the Höppler method at 20° C.).

Tylose® H20 is a hydroxyethylcellulose from Clariant AG having an average degree of polymerization n=220 whose 2% strength solution in water has a viscosity of about 20 mPa·s (by the Höppler method at 20° C.).

Tylose® H200 is a hydroxyethylcellulose from Clariant AG having an average degree of polymerization n=480 whose 2% strength solution in water has a viscosity of about 200 mPa·s (by the Höppler method at 200C).

Emulsogen® emulsifiers are nonionic surfactants from Clariant AG based on ethoxylated fatty alcohols.

The parts and percentages given in the Examples are by weight unless indicated otherwise. The solids content of the dispersions prepared in the following Examples is about 55%.

Example 1

Preparation of a butenylhydroxyethylcellulose by method I.

In a 2 l glass reactor fitted with anchor stirrer, 75 g of pine pulp (97% strength) are suspended in 593 g of virtually anhydrous isopropanol. After making inert with nitrogen, a solution of 19.4 g of sodium hydroxide in 152.2 g of water is allowed to run in while stirring at 25° C. The mixture is stirred for 60 minutes at 25° C. 91 g of ethylene oxide is allowed to run in, the temperature is held at 40° C. for 1 hour and subsequently at 80° C. for 1 hour. The desired amount of a butenyl chloride dissolved in 50 g of isopropanol is then added at about 50° C. and etherification is carried out for 2 hours at 115° C. After cooling to room temperature, the mixture is neutralized with 20% strength hydrochloric acid. The product is filtered off with suction and washed with 80% strength aqueous acetone until the salt content is <0.5%. Drying is carried out at 75° C. in a vacuum drying oven. Table 1 shows the individual examples.

TABLE 1

| Example No. | Pulp Type | g | Isopropanol | H₂O | NaOH | Butenylchloride Type | g | Ethyleneoxide | Yield (g) | Product MS HE | DS butenyl | Viscosity mPas 2% strength |
|---|---|---|---|---|---|---|---|---|---|---|---|---|
| Comparison | Conifer I | 75.0 | 643 | 152.2 | 19.4 | A | 0.0 | 91.0 | 114.7 | 2.12 | | 10000 |
| 1a | Conifer I | 75.0 | 643 | 152.2 | 19.4 | A | 4.1 | 91.0 | 111.0 | 2.65 | 0.035 | 11900 |
| 1b | Conifer I | 75.0 | 643 | 152.2 | 19.4 | A | 8.2 | 91.0 | 112.8 | 2.63 | 0.075 | 10900 |
| 1c | Conifer I | 75.0 | 643 | 152.2 | 19.4 | A | 20.5 | 91.0 | 118.1 | 2.47 | 0.189 | 10300 |
| Comparison | Conifer II | 75.0 | 643 | 152.2 | 19.4 | A | 0.0 | 91.0 | 116.1 | 2.48 | 0.000 | 130 |
| 1d | Conifer II | 75.0 | 643 | 152.2 | 19.4 | A | 4.1 | 91.0 | 117.4 | 2.34 | 0.036 | 140 |
| 1e | Conifer II | 75.0 | 643 | 152.2 | 19.4 | A | 8.2 | 91.0 | 119.8 | 2.36 | 0.072 | 145 |
| 1f | Conifer II | 75.0 | 643 | 152.2 | 19.4 | A | 20.5 | 91.0 | 111.9 | 2.61 | 0.132 | 160 |
| Comparison | Conifer I | 75.0 | 643 | 152.2 | 19.4 | B | 0.0 | 91.0 | 114.7 | 2.12 | 0.000 | 10000 |
| 1g | Conifer I | 75.0 | 643 | 152.2 | 19.4 | B | 4.1 | 91.0 | 120.0 | 2.52 | 0.017 | 7140 |
| 1h | Conifer I | 75.0 | 643 | 152.2 | 19.4 | B | 8.2 | 91.0 | 118.6 | 2.49 | 0.035 | 7680 |
| 1i | Conifer I | 75.0 | 643 | 152.2 | 19.4 | B | 20.5 | 91.0 | 122.6 | 2.19 | 0.085 | 5780 |
| 1k | Conifer I | 75.0 | 643 | 152.2 | 19.4 | B | 40.5 | 91.0 | 121.8 | 2.58 | 0.171 | 4460 |
| 1l | Conifer I | 75.0 | 643 | 152.2 | 28.7 | B | 61.0 | 91.0 | 117.7 | 2.08 | 0.224 | 3950 |
| Comparison | Conifer II | 75.0 | 643 | 152.2 | 19.4 | B | 0.0 | 91.0 | 118.9 | 2.14 | 0.000 | 156 |
| 1m | Conifer II | 75.0 | 643 | 152.2 | 19.4 | B | 4.1 | 91.0 | 120.0 | 2.11 | 0.014 | 136 |
| 1n | Conifer II | 75.0 | 643 | 152.2 | 19.4 | B | 8.2 | 91.0 | 118.4 | 2.30 | 0.033 | 133 |
| 1o | Conifer II | 75.0 | 643 | 152.2 | 19.4 | B | 20.5 | 91.0 | 118.4 | 2.09 | 0.083 | 143 |
| 1p | Conifer II | 75.0 | 643 | 152.2 | 19.4 | B | 40.5 | 91.0 | 116.3 | 2.26 | 0.154 | 142 |

A = 1-chloro-2-butene (crotyl chloride)
B = 3-chloro-1-butene (α-methylallyl chloride)
HE = hydroxyethyl Example 2

Preparation of butenyl-hydroxyethylcellulose by method II.

In a 2 l glass reactor fitted with blade stirrer, 80 g of hydroxyethylcellulose Tylose® are suspended in 520 g of 87% strength aqueous isopropanol. After evacuation and making inert with nitrogen, 50% strength sodium hydroxide solution is added and rinsed with about 15 ml of water. Alkalization is carried out for 2 hours at 25° C., the desired amount of a butenyl chloride dissolved in 50 g of isopropanol is added and etherification is carried out for 2 hours at 110° C. After cooling to room temperature, the mixture is neutralized with 20% strength hydrochloric acid. The product is filtered off with suction and washed with 80% strength aqueous acetone until the salt content is <0.5%. Drying is carried out at 75° C. in a vacuum drying oven.

Table 2 shows individual examples.

TABLE 2

| Example No. | HEC used Type | g | Isopropanol | NaOH (g) | (%) | H₂O | Butenylchloride Type | G | Yield (g) | Product MS HE | DS butenyl | Viscosity Mpas 2% strength |
|---|---|---|---|---|---|---|---|---|---|---|---|---|
| 2a | | 80.0 | 500 | 3.1 | 50 | 88 | A | 2.9 | 72.0 | 1.65 | 0.033 | 29 |
| 2b | Tylose ® | 80.0 | 500 | 6.2 | 50 | 87 | A | 5.8 | 72.1 | 1.64 | 0.083 | 29 |
| 2c | H 20 | 80.0 | 500 | 9.1 | 50 | 85 | A | 8.7 | 73.2 | 1.61 | 0.144 | 25 |
| 2d | MS: 1.59 | 80.0 | 500 | 15.2 | 50 | 82 | A | 14.4 | 69.4 | 1.58 | 0.245 | 27 |
| 2e | Moisture: 5.7 | 80.0 | 500 | 3.1 | 50 | 88 | B | 2.9 | 73.0 | 1.50 | 0.006 | 18 |
| 2f | Salt cont.: 2.6 | 80.0 | 500 | 6.2 | 50 | 87 | B | 5.8 | 72.6 | 1.61 | 0.019 | 18 |
| 2g | Viscosity: 21 | 80.0 | 500 | 9.1 | 50 | 85 | B | 8.7 | 73.5 | 1.64 | 0.033 | 23 |
| 2h | | 80.0 | 500 | 15.2 | 50 | 82 | B | 14.4 | 73.1 | 1.59 | 0.066 | 22 |
| 2i | | 80.0 | 500 | 3.1 | 50 | 88 | A | 2.9 | 73.1 | 1.71 | 0.033 | 20 |
| 2k | Tylose ® | 80.0 | 500 | 6.2 | 50 | 87 | A | 5.8 | 72.4 | 1.74 | 0.088 | 14 |
| 2l | H 10 | 80.0 | 500 | 9.1 | 50 | 85 | A | 8.7 | 72.8 | 1.62 | 0.141 | 15 |
| 2m | MS: 1.58 | 80.0 | 500 | 15.2 | 50 | 82 | A | 14.4 | 66.4 | 1.62 | 0.251 | 16 |
| 2n | Moisture: 5.7 | 80.0 | 500 | 3.1 | 50 | 88 | B | 2.9 | 71.5 | 1.71 | 0.003 | 16 |
| 2o | Salt cont.: 3.1 | 80.0 | 500 | 6.2 | 50 | 87 | B | 5.8 | 70.9 | 1.68 | 0.020 | 15 |
| 2p | Viscosity: 15 | 80.0 | 500 | 9.1 | 50 | 85 | B | 8.7 | 72.8 | 1.69 | 0.037 | 16 |
| 2q | | 80.0 | 500 | 15.2 | 50 | 82 | B | 14.4 | 70.7 | 1.71 | 0.067 | 15 |

A = 1-chloro-2-butene (crotyl chloride)
B = 3-chloro-1-butene (α-methylallyl chloride)
HE = hydroxyethyl Example 3 (comparison)

Preparation of a vinyl ester polymer dispersion using hydroxyethylcellulose.

The monomer mixture used consists of 25% of ® Veova 10 (vinyl ester of -branched $C_{10}$-carboxylic acids, Shell) and 75% of vinyl acetate. 423.09 g of deionized water are placed in a 2 liter reactor having a ground flange and lid and, while stirring, 14 g of hydroxyethylcellulose (Tylose® H 20, corresponding to 1.06% based on the finished polymer dispersion) are added at room temperature and dissolved. The following are then added in order:

3.5 g of borax
11.5 g of Emulsogen® EPA 073
20.0 g of Emulsogen® EPN 287
0.7 g of potassium peroxodisulfate
1.4 g of acetic acid (99–100%)
59.4 g of initiator solution (1.17% strength potassium peroxodisulfate solution)
70.0 g of monomer mixture The emulsion is heated to a temperature of from 74 to 77° C. over a period of 30 minutes and this temperature is held for 15 minutes. 630 g of monomer mixture are then added at a rate of 4.49 ml/min and 85.61 g of initiator solution (1.17% strength) are added at a rate of 0.51 ml/min from two separate Dosimats. A polymerization temperature of 80° C. is established. 630 g of monomer mixture are added over a period of 2 hours 40 minutes and the initiator solution is added over 2 hours 50 minutes.

After addition of the chemicals is complete, the reaction temperature of 80° C. is maintained for 2 hours. The dispersion is then cooled and 2 g of Mergal® K 9 N (Riedel de Haën) are added at 40° C. as preservative. The physical properties of the polymer dispersions are shown in Tables 3 and 4.

Assessment: The viscosity of the dispersion at a low shear rate is 11,700 mPa·s and is thus at the lower tolerable limit. The coagulum content (40 µm sieve) is very high (Table 4).

Example 4 (comparison)

In place of 14 g of Tylose® H 20, only 7.0 g were used.

The viscosiy of the dispersion is much too low (Table 3).

Example 5 (comparison)

In place of 14 g of Tylose® H 20 (viscosity 20 mPa·s at 2%), 14 g of Tylose® H200 (viscosity 200 mPa·s at 2%) were used.

The dispersion can be assessed generally as readily usable, but the viscosity at a high shear rate is at the upper limit of the desired range.

Example 6 (comparison)

In place of 14 g of Tylose® H 20 (viscosity 20 mPa·s at 2%), 7.0 g of Tylose® H 200 (viscosity 200 mPa·s at 2%) were used.

The viscosity of the dispersion at a low shear rate is too low and the particle size is too high (Table 4).

Example 7

In place of 14 g of Tylose® H20, 7.0 g of a butenylhydroxyethylcellulose prepared by method I and having a DS (butene) of 0.014 were used.

The polymer dispersion gives satisfactory results in all use and Theological tests (Table 3 and 4) at a cellulose ether usage reduced by half compared to Comparative Example 5.

Example 8

In place of 14 g of Tylose® H20, 7.0 9 of a butenyl-HEC prepared using method I and having a DS (butene) of 0.033 were used.

The polymer dispersion gives favourable rheological results and low water absorptions of the polymer film (Tables 3 and 4) at a cellulose ether usage reduced by half compared to Comparative Example 5.

Example 9

In place of 14 g of Tylose® H20, 7.0 g of a crotylhydroxyethylcellulose prepared using method II and having a DS (crotyl) of 0.033 are used.

The rheology of the dispersion can be judged as good (Table 3). The water absorption of the polymer films is favourable. The cellulose ether usage is reduced by half compared to Comparative Example 5.

Example 10

In place of 14 g of Tylose® H20, 7.0 g of a butenyl-HEC prepared by method II and having a DS (butene) of 0.066 are used.

The polymer dispersion gives satisfactory results in all use and rheological tests (Table 3 and 4) at a cellulose ether usage reduced by half compared to Comparative Example 5.

Example 11

In place of 14 g of Tylose® H20, 7.0 g of a crotyl-HEC prepared by method 11 and having a DS (crotyl) of 0.083 are used.

The polymer dispersion gives satisfactory results in all use and rheological tests (Tables 3 and 4) at a cellulose ether usage reduced by half compared to Comparative Example 5.

Example 12

In place of 14 g of Tylose® H20, 7.0 g of a crotyl-HEC prepared by method II and having a DS (crotyl) of 0.088 are used.

The polymer dispersion gives satisfactory results in all use and rheological tests (Tables 3 and 4) at a cellulose ether usage reduced by half compared to Comparative Example 5.

Example 13

In place of 14 g of Tylose® H20, 7.0 g of a crotyl-HEC prepared by method II and having a DS (crotyl) of 0.144 are used.

The dispersion viscosity is too low (Table 3), the particle size is coarse and the amount of coagulum is very low (Table 4) at a cellulose ether usage reduced by half compared to Comparative Example 5.

TABLE 3

Viscosity profiles of the example dispersions

| Cellulose ether | Example No. | Amount used (%) | DS butene | Type | Viscosity (mPas) at a shear rate of | | | | | | |
|---|---|---|---|---|---|---|---|---|---|---|---|
| | | | | | 1.00 (1/s) | 2.50 (1/s) | 6.30 (1/s) | 16.0 (1/s) | 40.0 (1/s) | 100 (1/s) | 250 (1/s) |
| Tylose ® H 20 | 3 | 1.06 | | | 11700 | 5740 | 2360 | 1380 | 730 | 433 | 270 |
| Tylose ® H 20 | 4 | 0.53 | | | 876 | 496 | 323 | 218 | 148 | 109 | 75 |
| Tylose ® H 200 | 5 | 1.06 | | | 24600 | 10300 | 4520 | 2250 | 1170 | 653 | 399 |
| Tylose ® H 200 | 6 | 0.53 | | | 1790 | 1040 | 624 | 380 | 232 | 154 | 104 |
| Butenyl - HEC | 7 | 0.53 | 0.014 | B | 20120 | 8600 | 3850 | 1880 | 937 | 518 | 302 |
| Butenyl - HEC | 8 | 0.53 | 0.033 | B | 24000 | 10300 | 4590 | 2210 | 1110 | 604 | 346 |
| Butenyl - HEC | 9 | 0.53 | 0.033 | A | 22400 | 8910 | 3990 | 1930 | 968 | 526 | 303 |
| Butenyl - HEC | 10 | 0.53 | 0.066 | B | 20100 | 8420 | 3810 | 1850 | 944 | 530 | 309 |
| Butenyl - HEC | 11 | 0.53 | 0.083 | A | 23500 | 9640 | 4250 | 2050 | 1040 | 578 | 343 |
| Butenyl - HEC | 12 | 0.53 | 0.088 | A | 22000 | 9490 | 4310 | 2080 | 1060 | 589 | 348 |
| Butenyl - HEC | 13 | 0.53 | 0.144 | A | 10500 | 4630 | 2170 | 1130 | 629 | 385 | 254 |

A = Prepared using 1-chloro-2-butene (crotyl chloride)
B = Prepared using 3-chloro-1-butene (α-methylallyl chloride)

TABLE 4

Particle sizes, coagulum contents, water absorption and degree of grafting of the example products

| Cellulose ether | Ex. No. | Amount used (%) | DS butene | Type | Particle size (nm) measured at | | Amount of coagulum (mg/1000 g of dispersion) | | Water absorption the dried film (%) | | Grafted HEC (% of |
|---|---|---|---|---|---|---|---|---|---|---|---|
| | | | | | 435 nm | 588 nm | 100 µm sieve | 40 µm sieve | 1st absorption | 2nd absorption | amount used) |
| Tylose ® H 20 | 3 | 1.06 | | | 235 | 255 | 262 | >1000 | 15.7 | 9.7 | <5 |
| Tylose ® H 20 | 4 | 0.53 | | | 318 | 406 | 361 | 418 | 18.8 | 12.7 | <5 |
| Tylose ® H 200 | 5 | 1.06 | | | 257 | 321 | 100 | 100 | 17.7 | 13.5 | 17.2 |
| Tylose ® H 200 | 6 | 0.53 | | | 397 | 475 | 158 | 196 | 14.6 | 10.3 | 12.4 |
| Butenyl - HEC | 7 | 0.53 | 0.014 | B | 217 | 229 | 266 | 789 | 15.1 | 10.7 | 9.5 |
| Butenyl - HEC | 8 | 0.53 | 0.033 | B | 221 | 237 | 484 | 900 | 14.4 | 9.9 | 14.0 |
| Butenyl - HEC | 9 | 0.53 | 0.033 | A | 211 | 226 | 603 | 910 | 12.9 | 10.6 | 24.7 |
| Butenyl - HEC | 10 | 0.53 | 0.066 | B | 252 | 274 | 128 | 389 | 16.7 | 9.9 | 22.5 |
| Butenyl - HEC | 11 | 0.53 | 0.083 | A | 247 | 267 | 196 | 597 | 14.5 | 10.6 | 39.5 |
| Butenyl - HEC | 12 | 0.53 | 0.088 | A | 255 | 255 | 184 | 520 | 16.5 | 11.3 | 35.8 |
| Butenyl - HEC | 13 | 0.53 | 0.144 | A | 309 | 349 | 107 | 82 | 21.0 | 11.0 | 44.1 |

A = Prepared using 1-chloro-2-butene (crotyl chloride)
B = Prepared using 3-chloro-1-butene (α-methylallyl chloride)

What is claimed is:

1. A water-soluble, nonionic cellulose ether selected from the group consisting of alkylcelluloses and hydroxyalkylcelluloses which are additionally substituted by butenyl groups.

2. A cellulose ether as claimed in claim 1 having the formula $$[C_6H_7O_2(OR^1)(OR^2)(OR^3)]_n$$

where $C_6H_7O_2$ is an anhydroglucose unit,
n is 50–1700,
and $R^1$, $R^2$ and $R^3$ are each, independently of one another, a polyalkylene oxide chain of the formula

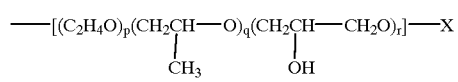

where X=H, $CH_3$, $C_2H_5$ or $CHR^4CR^5$=$CHR^6$ where p, q and r independently of one another in $R^1$, $R^2$ and $R^3$ can each independently assume values from 0 to 4, the sum of all (p+q+r) added over $R^1$, $R^2$ and $R^3$ per anhydroglucose unit is, on average, greater than 1.3 and less than 4.5, the order of the oxyalkylene units in the polyalkylene oxide chain can be any order desired and the average number of $CHR^4CR^5$=$CHR^6$ groups per anhydroglucose unit (DS butenyl) is from 0.003 to 0.5, and $R^4$, $R^5$ and $R^6$ are each an H atom or a $CH_3$ group, with only one of the radicals being a $CH_3$ group and the other two each being an H atom.

3. A cellulose ether as claimed in claim 1, wherein the average number of $CHR^4CR^5$=$CHR^6$ groups per anhydroglucose unit (DS butenyl) is from 0.02 to 0.06.

4. A cellulose ether as claimed in claim 2 which is a butenyl ether of hydroxyethylcellulose where $1.3<p<4.5$; $q=0$; $r=0$ or of hydroxypropylcellulose where $p=0$; $1.3<q<4.5$; $r=0$ or of dihydroxypropylcellulose where $p=0$; $q=0$; $1.3<r<4.5$.

5. A process for preparing a cellulose ether as claimed in claim 1 by etherification of cellulose with an etherifying agent selected from the group consisting of alkyl halides and alkylene oxides and etherification with a butenyl chloride or a butenyl glycidyl ether in the presence of a base.

6. A process for preparing a cellulose ether as claimed in claim 1 by etherification of a cellulose ether selected from the group consisting of alkylcelluloses and hydroxyalkylcelluloses with a butenyl chloride or a butenyl glycidyl ether in the presence of a base.

7. A process for the aqueous polymerization of a vinyl polymer comprising forming an emulsion of monomers with water and a cellulose ether as claimed in claim 1 as protective colloid and polymerizing said monomers to form said polymer.

8. An aqueous polymer dispersion prepared by free-radical-initiated polymerization of ethylenically unsaturated monomers in aqueous emulsion in the presence of from 0.2 to 5.0% by weight, based on the total amount of monomers used, of cellulose ethers as claimed in claim 1.

9. The cellulose ether as claimed in claim 2 wherein said sum of all (p+q+r) added over $R^1$, $R^2$, and $R^3$ per anhydroglucose unit is on average, from 1.5 to 3.0.

10. The cellulose ether of claim 2 wherein in said formula, n is 100–300.

* * * * *